(12) United States Patent
Izadpanah

(10) Patent No.: US 7,409,159 B2
(45) Date of Patent: Aug. 5, 2008

(54) WIRELESS WAVELENGTH DIVISION MULTIPLEXED SYSTEM

(75) Inventor: Hossein Izadpanah, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1410 days.

(21) Appl. No.: 09/897,747

(22) Filed: Jun. 29, 2001

(65) Prior Publication Data

US 2003/0002100 A1   Jan. 2, 2003

(51) Int. Cl.
*H04J 14/02* (2006.01)
*H04B 10/00* (2006.01)

(52) U.S. Cl. .................. 398/96; 398/115; 398/116; 379/56.1; 379/56.2

(58) Field of Classification Search ............. 398/79, 398/96, 115, 116; 379/56.1–56.3
See application file for complete search history.

(56) References Cited

U.S. PATENT DOCUMENTS

| | | | |
|---|---|---|---|
| 4,726,011 A | 2/1988 | Ih et al. ................ 370/3 |
| 4,904,993 A | 2/1990 | Sato ............... 340/825.57 |
| 5,016,242 A | 5/1991 | Tang ...................... 370/3 |
| 5,347,525 A | 9/1994 | Faris ..................... 372/19 |
| 5,457,561 A | 10/1995 | Taneya et al. ........... 359/172 |
| 5,600,471 A | 2/1997 | Hirohashi et al. ....... 359/152 |
| 5,661,582 A | 8/1997 | Kintis et al. ............. 359/172 |
| 5,818,619 A | 10/1998 | Medved et al. ........... 359/172 |
| 5,880,865 A | 3/1999 | Lu et al. ................. 359/125 |
| 5,896,211 A | 4/1999 | Watanabe ............... 359/124 |
| 5,936,578 A | 8/1999 | Driessen et al. .......... 342/374 |
| 5,946,120 A | 8/1999 | Chen ..................... 359/158 |
| 5,953,139 A * | 9/1999 | Nemecek et al. .......... 398/79 |
| 5,966,225 A | 10/1999 | Taglione et al. .......... 359/152 |
| 5,978,117 A | 11/1999 | Koonen ................. 359/125 |
| 5,999,295 A | 12/1999 | Vowell et al. ........... 359/152 |
| 6,009,115 A | 12/1999 | Ho ........................ 372/92 |
| 6,239,888 B1 * | 5/2001 | Willebrand .............. 398/129 |

(Continued)

FOREIGN PATENT DOCUMENTS

DE   44 33 896 C1   11/1995

(Continued)

OTHER PUBLICATIONS

Cai, M., et al., "5-Gbit/s BER Performance on an All Fiber-Optic Add/Drop Device Based on a Taper-Resonator-Taper Structure," IEEE Photonics Technology Letters, vol. 12, No. 9, pp. 1177-1179 (Sep. 2000).

(Continued)

*Primary Examiner*—Jason Chan
*Assistant Examiner*—Nathan Curs
(74) *Attorney, Agent, or Firm*—Ladas & Parry

(57) ABSTRACT

A system and method for linking optical wavelength division multiplexed (OWDM) networks by using wireless communications. Each optical channel in a OWDM network is coupled to a wireless wavelength division multiplexing (WWDM) channel by a WWDM transceiver, which transmits and receives data between OWDM networks. The WWDM transceiver may transmit and receive data in RF bands, where the assignment of different OWDM channels to different frequencies within the RF bands may depend upon the data rate or service supported by the OWDM channel. WWDM systems may also support communications between OWDM networks and individual users, such as those in a local multipoint distribution service.

67 Claims, 9 Drawing Sheets

U.S. PATENT DOCUMENTS

| | | | |
|---|---|---|---|
| 6,323,980 B1 | 11/2001 | Bloom | 359/159 |
| 6,411,414 B1* | 6/2002 | Abate et al. | 398/182 |
| 6,509,991 B1 | 1/2003 | Shibuya | 359/159 |
| 6,583,908 B1 | 6/2003 | Nakamura | 359/172 |
| 6,674,966 B1* | 1/2004 | Koonen | 398/70 |
| 6,778,318 B2 | 8/2004 | Sayyah et al. | 359/328 |
| 6,788,666 B1* | 9/2004 | Linebarger et al. | 370/338 |
| 2001/0053011 A1 | 12/2001 | Imajo | 359/173 |
| 2002/0028043 A1* | 3/2002 | Medved et al. | 385/39 |
| 2002/0097468 A1 | 7/2002 | Mecherie et al. | 359/152 |
| 2002/0122230 A1* | 9/2002 | Izadpanah et al. | 359/145 |

FOREIGN PATENT DOCUMENTS

| | | |
|---|---|---|
| EP | 0 835 035 A1 | 4/1998 |
| EP | 0 876 020 A1 | 11/1998 |
| EP | 0 887 965 A1 | 12/1998 |
| EP | 0 993 124 A2 | 4/2000 |
| JP | 2000-147306 | 5/2000 |
| JP | 2000-315983 | 11/2000 |
| JP | 2001-103545 | 4/2001 |
| WO | 00/08783 | 2/2000 |
| WO | 00/16489 | 3/2000 |
| WO | 00/29886 | 5/2000 |
| WO | 01/26263 A2 | 4/2001 |
| WO | 01/35551 A1 | 5/2001 |
| WO | 01/86982 A1 | 11/2001 |

OTHER PUBLICATIONS

Cai, M., et al., "Observation of Critical Coupling in a Fiber Taper to a Silica-Microsphere Whispering-Gallery Mode System," *Physical Review Letters*, vol. 85, No. 1, pp. 74-77 (Jul. 3, 2000).

Cai, M., et al., "Fiber-coupled microsphere laser," *Optics Letters*, vol. 25, No. 19, pp. 1430-1432 (Oct. 1, 2000).

Cai, M., et al., "Fiber-Optic Add-Drop Device Based on a Silica Microsphere-Whispering Gallery Mode System," *IEEE Photonics Technology Letters*, vol. 11, No. 6, pp. 686-687 (Jun. 1999).

Logan, Jr., R.T., "All-Optical Heterodyne RF Signal Generation Using a Mode-Locked-Laser Frequency Comb: Theory and Experiments," *IEEE International Microwave Symposium Digest*, Paper #TH4C-2, 4 pages (Jun. 15, 2000).

Kitayama, K., "Highly Stabilized Millimeter-Wave Generation by Using Fiber-Optic Frequency-Tunable Comb Generator," *Journal of Lighwave Technology*, vol. 15, No. 5, pp. 883-893 (May 1997).

Coppin, P. and T.G. Hodgkinson, "Novel Optical Frequency Comb Synthesis Using Optical Feedback," *Electronics Letters*, vol. 26, No. 1, pp. 28-30 (Jan. 4, 1990).

Maleki, L., "Technical Support Package on Whispering-Gallery-Mode Microsperes as Light Modulators," *Nasa Tech Brief*, vol. 24, No. 11, 10 pages (Nov. 2000).

Ohteru, S. and Noboru Takachio, "Methodology of Unequally Spaced Frequency Allocation for WDM Transmission Systems Using Typical Dispersion-Shifted Fiber Cable," *IEICE Trans. Commun.*, vol. E83-B, No. 6, pp. 1290-1297 (Jun. 2000).

JDS Uniphase, Product Information for FBG1500-ADM Series—Fiber Bragg Circulated Fixed Add/Drop Modules and WD1515 A1/D1—100 GHz Spaced ITU-Channel Add/Drop WDM Couplers, 2 pages <http://www.jdsunph.com/HTML/catalog/prod>.

Giganet Corp., Product Information for EtherAir 1500™—2x100Base-TX over OC-3/STM-1, 6 pages <http://www.giganet-corp.com/1500100/html>.

Sicom Incorporated, Product Information for DVB Satellite Modulator Products, 1 page <http://www.sicom.com/sicom/products/html>.

Sicom Incorporated, Product Information for SM7060 Programmable Digital Modulator ASIC and MC2470 Modulator Circuit Card, 6 pages.

Gould Fiber Optics, Product Information for Wavelength Division Multiplexers, 5 pages.

Ceragon Networks, Product Information for FibeAir 3100 and FibeAir 6200, 4 pages.

ICS LaserSpeed Solutions, Product Information for SkyNet™ 500 Series—Quick Connectivity for 100 Mbps Fast Ethernet, 2 pages.

Novak, D., "Signal Generation Using Pulsed Semiconductor Lasers for Application in Millimeter-Wave Wireless Links," *IEEE Transactions on Microwave Theory and Techniques*, vol. 43, NO. 9, Part 2, pp. 2257-2262 (Sep. 1995).

Kitayama, K., "Highly-stabilized, Tunable Millimeter-wave Generation by Using Fiber-optic Frequency Comb Generator," *Microwave Photonics*, pp. 13-16 (1996).

Clark, G. et al., "Hybrid Free Space Optical/Microwave Communication Networks: A Unique Solution For Ultra-High-Speed Local Loop Connectivity," *Proceedings of the SPIE—The International Society for Optical Engineering, Optical Wireless Communications, Communications III*, vol. 4214, pp. 46-54 (Nov. 6-7, 2000).

Kavehrad, M., "A Countermeasure To Improve Outage Performance Of Interference-Limited Microwave Radio Links" *Canadian Electrical and Computer Engineering Journal*, vol. 16, No. 1, pp. 13-18 (Jan. 1991).

"LMDS Versus Free-Space Optical Networks," *Lightpointe Communications, Inc.*, INTERNET: http://www.lightpointe.com/index.cfm/fuseaction/technology.Whitepapers>_10 pages total (2001).

"Wireless Optics Protection of Fiber Via SONET Ring Closure," *Lightpointe Communications, Inc.*, pp. 1-10 (2001).

* cited by examiner

POSSIBLE WWDM FREQUENCY ALLOCATIONS

WIRELESS WAVELENGTH DIVISION MULTIPLEXED SYSTEM

FIELD OF THE INVENTION

The present invention relates to multiple channel communication systems, and more specifically to multiple channel communication systems supported by integrated optical and wireless wavelength division multiplexed networks.

BACKGROUND OF THE INVENTION

Wavelength Division Multiplexing (WDM) is a basic technology of networking optical signals. It is a technique by which a single fiber is used to carry many separate and independent optical channels. Each channel within the optical wavelength division multiplexed (OWDM) network is assigned a separate optical wavelength at which it is transmitted through the network. In a "sparse" OWDM system, the optical wavelengths are (relatively) widely separated. For example, two optical wavelengths of 850 nm and 1310 nm may be used in a sparse system. Such a system has an advantage of being easily implemented, but a major disadvantage is the limited number of optical channels that can be carried. In a "dense" OWDM system, the optical wavelengths are closely spaced. In a typical dense optical wavelength division multiplexed (DOWDM) system, the channel spacing may be as small as 1 nm or less. DOWDM systems provide substantially more channels than a sparse system, but are also more complex and difficult to implement.

Since OWDM networks comprise multiple communication channels, network control and routing can be achieved by directing specific channels to specific users. This concept is referred to in the art as Add-Drop Multiplexing (ADM). In ADM, an optical WDM network passes through multiple locations or nodes. At each node, one or more individual optical channels are removed (dropped) from the WDM stream and terminated in a local device. Similarly, a channel can be added into the WDM stream. Such ADM networks can be implemented using fixed wavelengths assigned to each node, or each node can be dynamically assigned wavelengths for dedicated data transmission and reception. Such dynamic ADM networks may be implemented with the wavelength allocation determined at each node or a master controller can be used to dynamically determine the wavelength allocation at each node.

OWDM networks may also provide the ability, in a given network, to allocate different services (or area of coverage) to different optical wavelengths for direct addressing. One example is in hybrid fiber coax WDM technology, where each service (broadcast video, pay per view, etc.) or different housing communities are routed by a designated wavelength in a Passive Optical Network (PON) architecture. Allocation of different services to different wavelengths simplifies the distribution of these services via optical networks, since the distribution hardware used in the networks does not need to know the type of service carried at each wavelength.

OWDM networks provide the capability to transmit large amounts of data between locations, but they have a fundamental limitation. OWDM networks require the use of optical fiber to move data from one point to another. Hence, areas where installation and maintenance of optical fiber is difficult and expensive may not be served by OWDM networks. These areas may comprise rural areas where there are few users and these users are separated by significant distances, making the provision of fiber uneconomic. These areas may also include densely populated urban areas where the costs of interfering with the infrastructure and providing OWDM fiber to multiple locations may be prohibitively expensive.

OWDM networks may still be deployed in these areas, but they will generally be deployed in a relatively small area, servicing users who are closely located. Links to users on other networks may be accomplished by tieing the networks together through the use of OWDM fiber or through the use of lower performing non-WDM data links. Coupling the separate OWDM networks through the use of OWDM fiber has the difficulty and expense factors discussed above. Non-WDM data links (such as radio frequency links or telephone lines) can be provided at a lower cost, but the networking capabilities inherent in a WDM network are lost.

Use of radio frequency links to tie together data networks is known in the art. For example, Ceragon Networks Ltd. of Tel Aviv, Israel provides products such as the FiberAir 3100 or 6200 Digital Radio System, which may be used to couple multiple Ethernet, SONET/SDH, or ATM networks. However, these systems operate at the transport level of the coupled networks, in that they recognize and process the protocol of the data transferred within the networks. This increases the overhead and complexity of the hardware used to couple the networks. In addition, these systems require network management to ensure that the coupled networks operate correctly.

Hence, there exists a need in the art for wirelessly linking separate OWDM networks with low cost, low overhead, and low complexity links while allowing transparent transfer of data between the linked OWDM networks.

SUMMARY OF THE INVENTION

It is therefore an object of the present invention to provide a system and method for linking separate fiber OWDM networks via wireless communication to allow the combined networks to be operated as a single and unified WDM network.

It is a further object of the present invention to provide integrated management of the single and unified WDM network to provide wavelength routing, addressing, and switching capabilities of the separate channels in the network.

The system and method of the present invention is provided by a one-to-one mapping of the wavelengths of the optical channels in an OWDM network to wireless channel frequencies. Hence, each optical channel in an OWDM network in the optical domain will be replicated with a radio frequency (RF) channel in the radio frequency domain. The RF channels can then be radiated from one location to another location by free-space, that is, wireless, radiation. At the receiving location, the RF channels are converted back to optical channels for distribution within a fiber-based OWDM system.

A method according to the present invention for coupling optical wavelength division multiplexed (OWDM) networks having one or more OWDM channels comprises the steps of: receiving the one or more OWDM channels from a first OWDM network, each OWDM channel having a different OWDM wavelength; converting each one of the one or more OWDM channels to a wireless wavelength division multiplexing (WWDM) channel to produce one or more WWDM channels at a plurality of WWDM wavelengths, each WWDM wavelength for each WWDM channel being different from the WWDM wavelength for each other WWDM channel, and each WWDM wavelength corresponding to an OWDM wavelength; radiating the one or more WWDM channels; receiving the one or more WWDM channels; converting each one of the received WWDM channels from the WWDM wavelength for that WWDM channel back to the corresponding OWDM wavelength for that WWDM channel to produce one or more received OWDM channels; and coupling the one or more received OWDM channels into a second OWDM network.

In the method described above, a standardized one-to-one mapping may be used to map OWDM channels to WWDM channels and vice versa. This standardized one-to-one mapping may be based upon the data rate of the OWDM channel and the bandwidth available for the WWDM channel, which may depend upon the frequency band at which the WWDM channel operates. The method described above may also be used to link OWDM channels to different and geographically dispersed radio frequency users.

The method for coupling optical networks may further comprise the step of distributing voice and data services (hereinafter voice/data services) to other wireless users. One or more OWDM channels may be allocated for voice/data services and these voice/data OWDM channels may be converted to WWDM channels in the manner described above. If the WWDM channels are radiated at frequencies compatible with local wireless user equipment, these WWDM channels can be received and sent by that local wireless user equipment. The local wireless equipment can then extract the voice/data services from the radiated WWDM channels and can convert the voice/data services for transmission within the WWDM channels for reception and conversion back to voice/data OWDM channels.

A wireless wavelength division multiplexing (WWDM) system according to the present invention for coupling optical wavelength division multiplexed (OWDM) networks may comprise: one or more WWDM transmitters receiving one or more optical wavelength division multiplexed (OWDM) channels, each OWDM channel having a different OWDM wavelength, said WWDM transmitter converting the one or more OWDM channels to one or more WWDM channels, each WWDM channel having a different WWDM wavelength; one or more radiating apertures coupled to each WWDM transmitter, said radiating apertures radiating the WWDM channels; one or more receiving apertures receiving WWDM channels; one or more WWDM receivers coupled to the one or more receiving apertures, each WWDM receiver receiving one or more received WWDM channels, and each WWDM receiver converting the one or more received WWDM channels to one or more OWDM channels.

The WWDM transmitter in the WWDM system described above may comprise: an OWDM demultiplexer; an optical-to-electrical converter coupled to the OWDM demultiplexer and producing one or more baseband electrical signals; a comb frequency generator producing a plurality of intermediate frequency signals; a bank of modulators, each modulator in the bank of modulators receiving a baseband electrical signal from the optical-to-electrical converter and receiving an intermediate frequency signal from the comb frequency generator and producing a modulated baseband electrical signal; and one or more upconverters receiving the modulated baseband signals and producing the one or more WWDM channels.

The WWDM receiver in the WWDM system described above may comprise: one or more downconverters receiving the one or more received WWDM channels and producing one or more received baseband signals; a comb frequency generator producing a plurality of intermediate frequency signals; a bank of demodulators, each demodulator in the bank of modulators receiving one of the one or more received baseband signals from the one or more downconverters and receiving an intermediate frequency signal from the comb frequency generator and producing a demodulated baseband electrical signal; an electrical-to-optical converter receiving each one of the demodulated baseband electrical signals and producing an optical signal for each demodulated baseband electrical signal at an OWDM wavelength corresponding to the WWDM wavelength for the WWDM channel from which the optical signal is derived; and an OWDM multiplexer receiving each optical signal and producing the one or more OWDM channels.

DETAILED DESCRIPTION OF PREFERRED EMBODIMENTS

Figure 1:
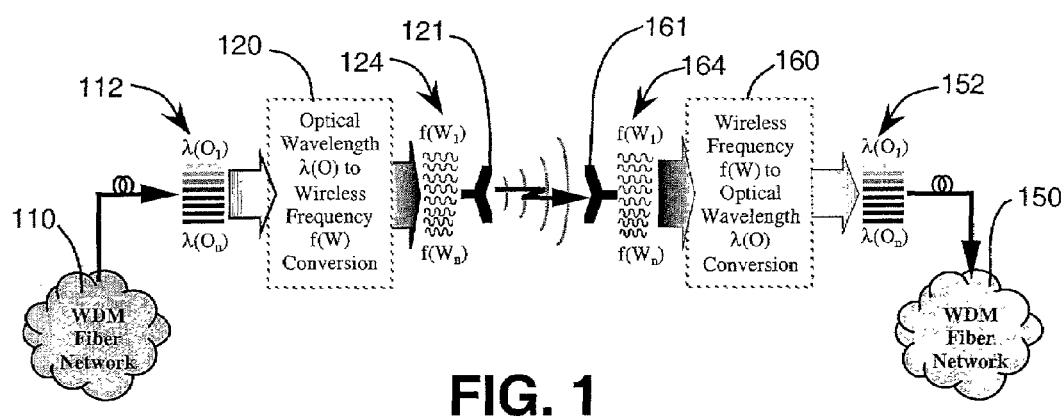
FIG. 1 is a simplified block diagram of a Wireless Wavelength Division Multiplexing (WWDM) system according to an embodiment of the present invention.

The system of wireless wavelength division multiplexed networking according to the present invention will be described with reference to the accompanying figures. A high-level view of an embodiment of the system according to the present invention is provided in FIG. 1. In FIG. 1, the optical channels of a first optical network 110 using optical wavelength division multiplexing are shown as a first set of individual optical signals 112 at wavelengths $\lambda(O_1) \ldots \lambda(O_n)$ (hereinafter $\lambda_1 \ldots \lambda_n$). Preferably, the first optical network 110 comprises a wavelength division multiplexed fiber network. These individual optical signals 112 at the optical wavelengths $\lambda_1 \ldots \lambda_n$ are converted to radio frequency (RF) signals 124 at wireless frequencies $f(W_1) \ldots f(W_n)$ (hereinafter $f_1 \ldots f_n$) by an optical wavelength to wireless frequency converter 120. The RF signals 124 are then transmitted from a first RF aperture 121 and received by a second RF aperture 161. The received RF signals 164 at the wireless frequencies $f_1 \ldots f_n$ are then converted back to a second set of optical signals 152 at, preferably, the same optical wavelengths $\lambda_1 \ldots \lambda_n$ by a wireless frequency to optical wavelength converter 160 and sent to a second optically-based network 150. Preferably, there is a standard, one-to-one mapping of optical WDM wavelengths to wireless frequencies. The RF signals are simply wireless frequency analogs to the OWDM wavelengths, and, therefore, the overall scheme may be referred to as wireless wavelength division multiplexing (WWDM).

Figure 2:
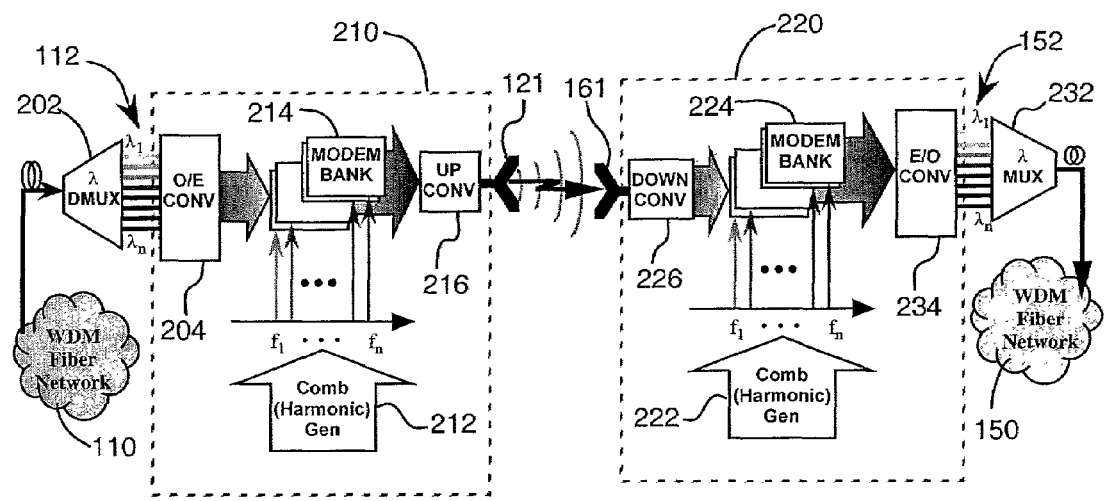
FIG. 2 is a detailed block diagram of a one-way transmission embodiment of a WWDM system according to the present invention.

FIG. 2 shows a more detailed block diagram of the elements that may be used to implement a WWDM system according to the present invention. An optical demultiplexor 202 separates a multiple wavelength optical signal from the OWDM network 110 into a first set of several optical signals 112 at their separate optical wavelengths $\lambda_1 \ldots \lambda_n$. The several optical signals 112 are coupled to a WWDM transmitter 210. The WWDM transmitter 210 comprises an optical-to electrical converter 204, a transmit comb frequency generator 212, a modem bank 214, and an upconverter 216. An optical-to-electrical converter 204 converts the several optical signals 112 modulated at the optical wavelengths to baseband electrical signals. The embodiment of the WWDM transmitter 210 depicted in FIG. 2 shows the transmitter 210 receiving optical signals, while alternative embodiments of the transmitter may omit the internal optical-to-electrical converter 204, such that electrical signals are coupled to the transmitter 210. The baseband electrical signals are then coupled to the modem bank 214. The modem bank 214 comprises a plurality of baseband modulators. The transmit comb frequency generator 212 generates a plurality of intermediate frequency carrier signals at equally spaced frequencies $f_1 \ldots f_n$. These frequencies are provided to the modem bank 214 that modulates each baseband electrical signal obtained from the data signals in the OWDM network 110. The modulated signals are then coupled to the upconverter 216 for up conversion to radio frequencies within a specified RF band. RF bands at frequencies used for cellular telephony, personal communication systems, microwave or millimeter wave communications may be used. Preferably, the transmit comb frequency generator 212 is preset to create a grid of frequencies that map directly to the optical wavelengths used in the OWDM network 110 in a one-to-one correspondence. A standard set of frequencies may be used to provide for interoperability between WWDM systems.

The radiating aperture 121 radiates the RF signals towards the receiving aperture 161 connected to a WWDM receiver 220. The radiating aperture 121 and the receiving aperture 161 may comprise RF transmit and receive antennas well known in the art. The WWDM receiver 220 comprises a downconverter 226, a receive comb frequency generator 222, a modem bank 224 comprising a plurality of baseband demodulators, and an electrical-to-optical converter 234. WWDM RF signals received by the receiving aperture 161 are directed into the downconverter 226 which provides downconverted signals. The downconverted signals are demodulated within the modem bank 224 with a plurality of intermediate frequency carrier signals at equally spaced frequencies $f_1 \ldots f_n$ generated by the receive comb frequency generator 222. The frequencies generated by the transmit and receive comb frequency generators 212, 222 should be the same to provide for proper modulation and demodulation of the baseband electrical signals. The modem bank 224 provides baseband electrical signals containing data information. These baseband electrical signals are coupled to an electrical-to-optical converter 234 to produce the second set of optical signals 152 which, preferably, have the same optical wavelengths as the first set of optical signals 112. A multiplexer 232 then combines the second set of optical signals into a single composite optical signal which is transferred to the second OWDM network 150.

An alternative method and apparatus for converting OWDM channels to WWDM channels is described in the copending patent application "Optical-to-Wireless WDM Converter," Ser. No. 09/897,713 filed on Jun. 29, 2001 incorporated herein by reference. The optical-to-wireless converter described in that application provides for conversion of OWDM channels to WWDM channels by extracting optical carriers from the OWDM channels, frequency shifting the optical carriers by the frequencies of the wireless carriers, and optically heterodyning the frequency-shifted optical carriers with the OWDM channels to generate WWDM channels.

Figure 3:
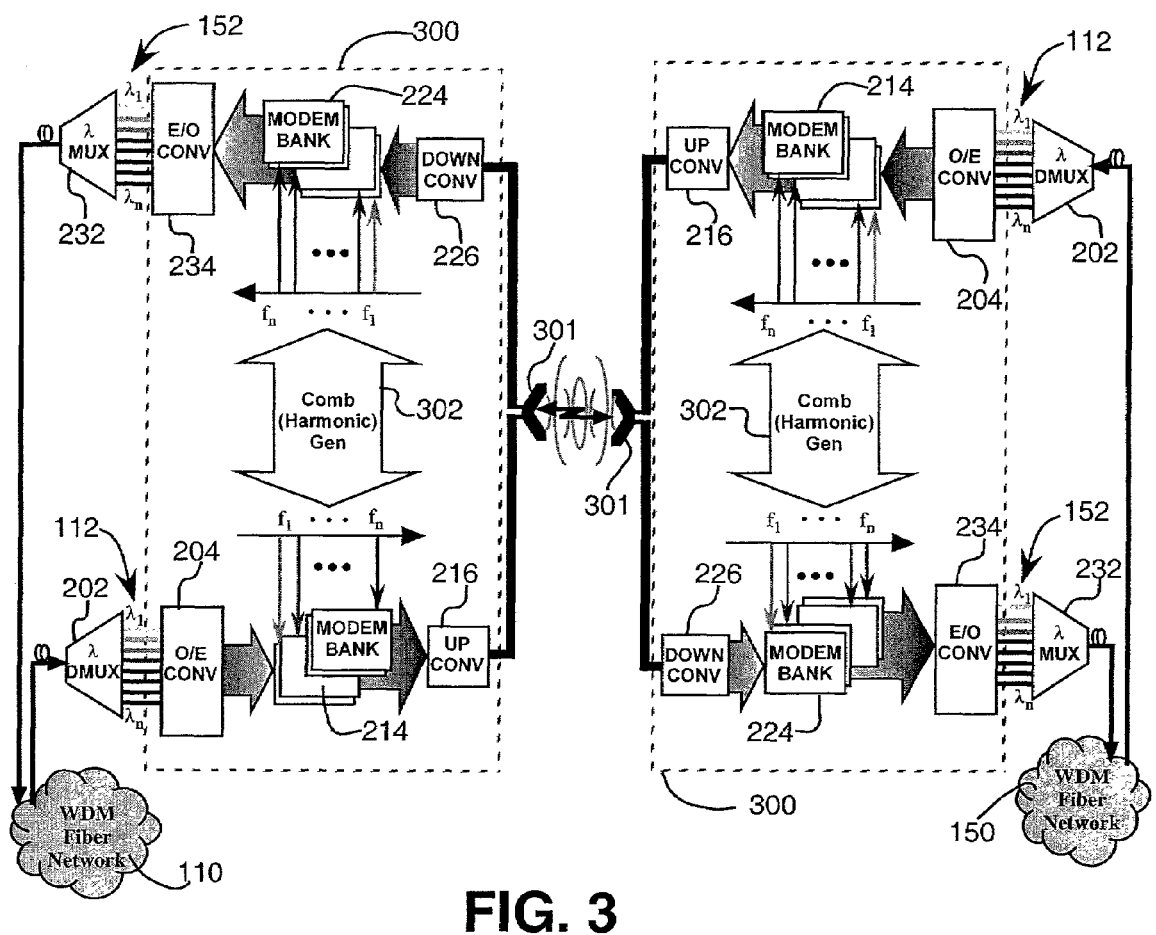
FIG. 3 is a detailed block diagram of a bi-directional embodiment of a WWDM system according to the present invention.

FIGS. 1 and 2 illustrate a one-way embodiment of a WWDM system, where optical signals are sent from a first optical network 110 to a second optical network 150. FIG. 3 illustrates an embodiment of a WWDM system where data transfer between the first optical network and the second optical network is bi-directional, that is, both optical networks may both send and receive data over a WWDM connection.

In FIG. 3, each optical network 110, 150 is coupled to a WWDM transceiver 300. Each WWDM transceiver 300 is coupled to an optical demultiplexer 202 which provides individual optical signals 112, as described above. Each WWDM transceiver 300 is also coupled to an optical multiplexer 232 which couples the modulated optical signals 152 into the optical network 110, 150. Alternative embodiments of WWDM transceivers may be coupled to networks via electrical signals such that optical-to-electrical and electrical-to-optical converters are provided external to WWDM transceivers to couple the transceivers to optical networks.

The WWDM transceiver 300 may simply be a combination of the WWDM transmitter 210 and the WWDM receiver 220 described above. If so, each transceiver 300 comprises an upconverter 216, downconverter 226, modem bank for modulation 214, modem bank for demodulation 224, one or more comb frequency generators 302, an optical-to-electrical converter 204 and an electrical-to-optical converter 234. Preferably, the comb frequency generator 302 generates a single set of intermediate frequencies for both transmitted and received signals. This provides for a direct one-to-one correspondence between optical wavelengths in the OWDM networks and the WWDM frequencies. However, the comb frequency generator 302 may generate two sets of frequencies, $f_{t1} \ldots f_{tn}$ for transmission and $f_{r1} \ldots f_{rn}$ for reception, to reduce signal interference between transmitted and received signals. Alternatively, the upconverter 216 and downconverter 226 in each WWDM transceiver 300 may be configured to send and receive signals at different RF bands to reduce signal interference. Other signal interference reducing techniques known in the art may also be used, such as time division multiplexing or spread spectrum techniques.

As is well known in the art, the data transfer capability of each radiated RF signal is dependent upon the bandwidth of the RF signal and the modulation technique used for the RF signal. The number of individual RF signals or channels and the bandwidth of each channel is dependent upon the RF band in which the RF channels are transmitted. Lower frequency bands, such as the 2 GHz band used for cellular and Personal Communication Services (PCs) transmissions, can accommodate only relatively few, narrow bandwidth channels. Higher frequency bands, such as the 28 and 38 GHz bands allocated for Local Multipoint Distribution System (LMDS)

transmissions, can accommodate more narrowband RF channels and/or wider bandwidth RF channels.

Figure 4:
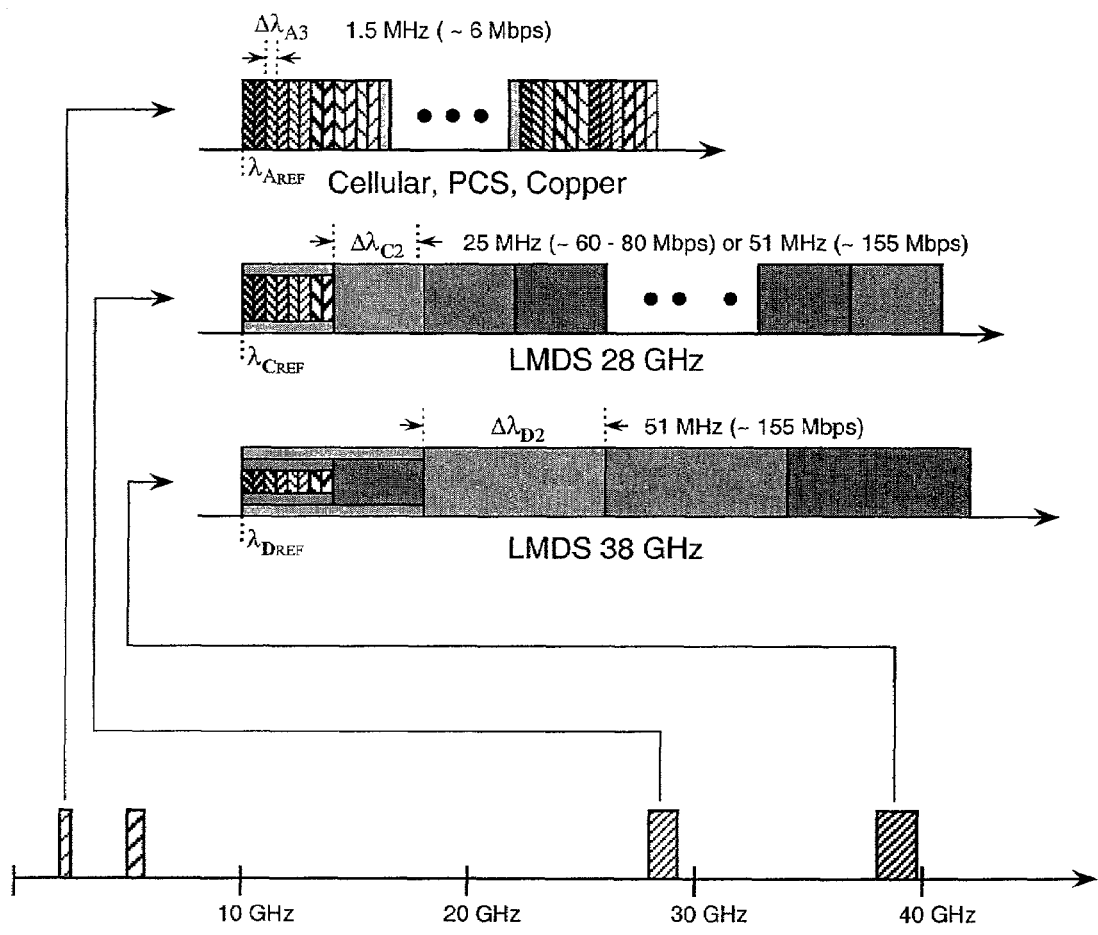
FIG. 4 shows a possible allocation of WWDM channels at different RF bands.

FIG. 4 illustrates a possible allocation of WWDM channels at different frequency bands. At the PCS and Cellular band of 2 GHz, between 20 to 50 WDM RF channels can be accommodated, each with a maximum RF bandwidth of 1.5 MHz and a data bandwidth of up to 6 megabits per second (Mbps). At a higher frequency band, such as the 28 GHz band allocated for LMDS services, a first portion of the 28 GHz band may be allocated for several narrowband channels with a data bandwidth of up to 6 Mbps. Other portions of the 28 GHz band may be allocated for wider band signals requiring 25 MHz or 51 MHz of bandwidth. A 25 MHz channel can accommodate a data bandwidth of 60-80 Mbps, while a 51 MHz channel can accommodate a data bandwidth of up to 155 Mbps, which is the data bandwidth for SONET data rates. At an even higher frequency band, such as the 38 GHz LMDS band, more total bandwidth may be available for WWDM channels. A portion of the 38 GHz LMDS band may again be allocated for several narrowband channels, while the remainder of the band may be allocated for wider bandwidth channels, such as those used for SONET transmissions.

Preferably, a universal standard frequency grid is used for interoperability between different optical networks coupled via WWDM systems. A standard grid allows a data signal modulated at a first optical wavelength in a first OWDM network to be radiated from that network with a first WWDM system and received at a second WWDM system and then remodulated and coupled into the second OWDM network at a wavelength corresponding to the first original optical wavelength. Data is transferred between the first and second OWDM networks such that the conversion from optical to RF and back to optical is transparent to both networks.

It is also preferable that universal standard frequency channel allocations be used for each RF frequency band in which the WWDM systems are to operate. That is, relatively low data bandwidth optical channels may be allocated for transmission at cellular or PCs frequency bands, where the available RF bandwidth is relatively narrow, while larger data bandwidth optical channels may be allocated for transmission in the 28 or 38 GHz LMDS bands, where the available RF bandwidth is larger. As indicated above, the channel allocations may be such that the narrow band channels are allocated at both the lower frequency bands and at higher frequency bands, since the narrow band channels require relatively little bandwidth.

Standard channel allocations are preferable to ensure that data transmission between OWDM networks via WWDM systems is transparent to the OWDM networks and does not require any type of overall WWDM system controller. The channel allocation may be accomplished by using a two-dimensional matrix table $\lambda_{ij}$, where i represents a frequency band (such as Cellular, PCs, LMDS, etc.) and j represents a channel number in that band, and $\lambda_{ij}$ represents the frequency allocated for that band and channel. The channel allocations in the WWDM matrix table may then be mapped to standard OWDM channels so that WWDM channels providing sufficient bandwidth are mapped to the correct OWDM channels.

Figure 5A:
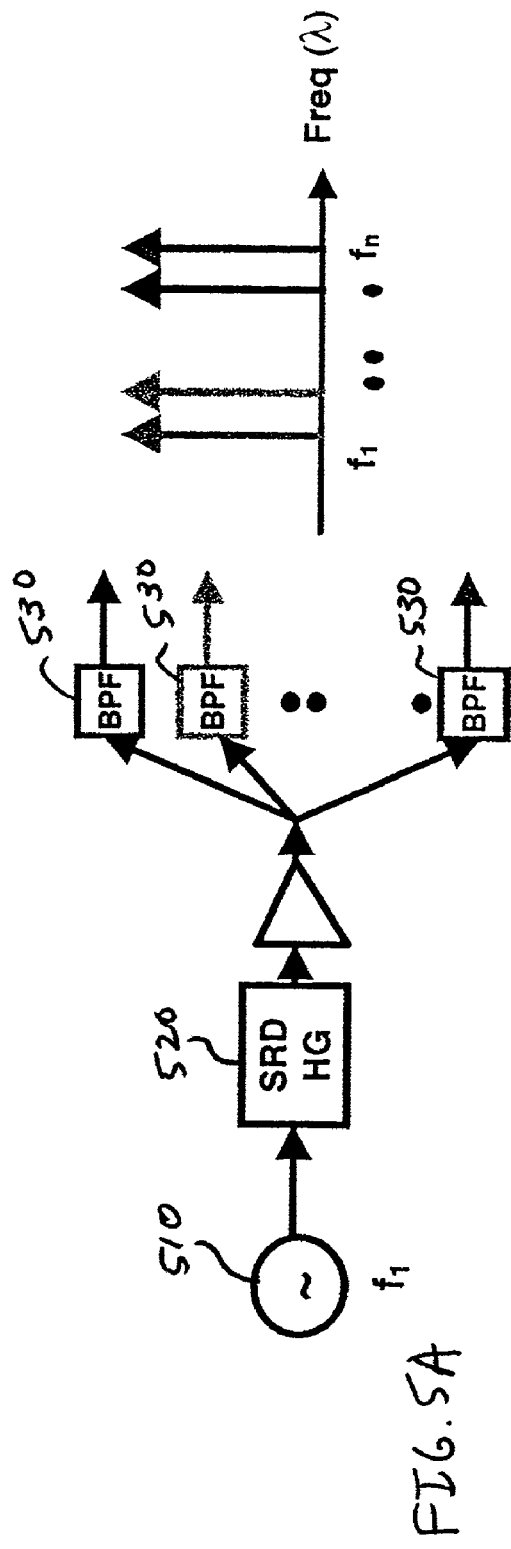
FIG. 5A is a simplified block diagram of an apparatus for generating a comb of radio frequencies.
Figure 5B:
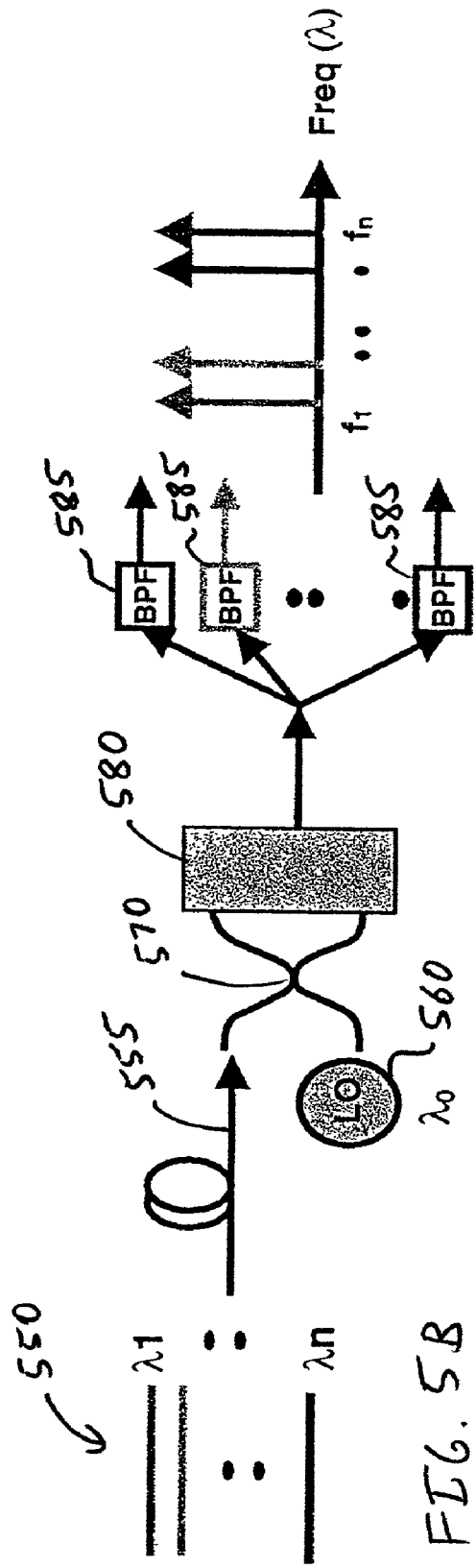
FIG. 5B is a simplified block diagram of an apparatus for generating a comb of either radio or optical frequencies.

The comb frequency generator as shown in FIGS. 1, 2, and 3 is a well-known device that may be used to generate a plurality of continuous wave (CW) signals at different frequencies with specific frequency offsets between the signals at different frequencies. FIG. 5A shows one method which may be used to generate the necessary signals at different frequencies. In FIG. 5A, a sinusoidal source 510 produces a CW signal at frequency $f_1$. The sinusoidal source 510 is coupled to a harmonic generator means 520, such as a step recovery diode, varactor diode, or other harmonic generator means known in the art. The harmonic generator means 520 produces a signal at the frequency $f_1$ of the sinusoidal source 510 and signals at harmonics of that frequency $f_1$. Electrical bandpass filters 530 set at different pass frequencies produce a plurality of CW signals at different frequencies $f_1 \ldots f_n$. FIG. 5B illustrates a method for generating a comb of optical CW signals. In FIG. 5B, a plurality of optical signals 550 at different optical wavelengths $\lambda_1 \ldots \lambda_n$ in a single fiber 555, such as the signals within an OWDM network, are coupled into an optical coupler 570 together with a CW optical signal produced by a local optical oscillator 560. This coupling creates a comb of optical beat frequencies equal to the difference in frequency of the local oscillator signal and the frequencies of each signal in the plurality of optical signals 550. An optical-to-electrical converter 580 and bandpass filters 585 may then be used to extract individual frequencies used for modulating WWDM signals in the radio frequency domain or the comb of optical frequencies may be used to directly modulate optical signals. Additional techniques for generating frequency combs are described by R. Logan in "All-Optical Heterodyne RF Signal Generation Using a Mode-Locked-Laser Frequency Comb," International Microwave Symposium Digest, Paper #TH4C-2, Jun. 15, 2000, Ken-ichi Kitayama in "Highly Stabilized MM-Wave Generation By Using Fiber-Optic Frequency Tunable Comb Generator," Journal of Lightwave Technology, vol. 15, no. 5, May 1997, pp. 883-893, and P. Coppin et al. in "Novel Frequency Comb Synthesis Using Optical Feedback," Electronics Letters, Jan. 4, 1990, vol. 26, no. 1, pp.27-30.

The WWDM systems according to the present invention are preferably used for transmission of digital data. Since data in OWDM networks is generally in a digital form, the conversion of optical signal to baseband electrical signals, as shown in FIGS. 1, 2, 3, usually results in a digital data stream for each optical signal. The modems shown in the modem banks in FIGS. 1, 2, and 3 normally process the digital signals into In-Phase (I) and Quadrature (Q) bit streams. To preserve signal bandwidth, each modem then converts multiple bits of each I/Q bit stream into symbols for representation as a Phase Shift Keying (PSK) or Quadrature Amplitude Modulation (QAM) signal. Modulation of the PSK or QAM signal with a carrier signal from the comb frequency generator provides for an analog signal at an intermediate frequency or radio frequency.

Modems in the modem banks may be provided by commercial of-the-shelf (COTS) components. Examples of COTS modems applicable to WWDM systems are wireless broadband modem products available from SiCom Incorporated of Scottsdale, Ariz. SiCom provides integrated circuits, such as the SM 7060 Programmable Digital Modulator ASIC, and circuit cards, such as the MC2470 Modulator Circuit Card, that can be used to provide a PSK or QAM signal at a specified IF output frequency.

WWDM systems according to the present invention are not limited to the coupling of only two individual OWDM networks. Other network architectures and topologies are provided by other embodiments of WWDM system according to the present invention.

Figure 6:
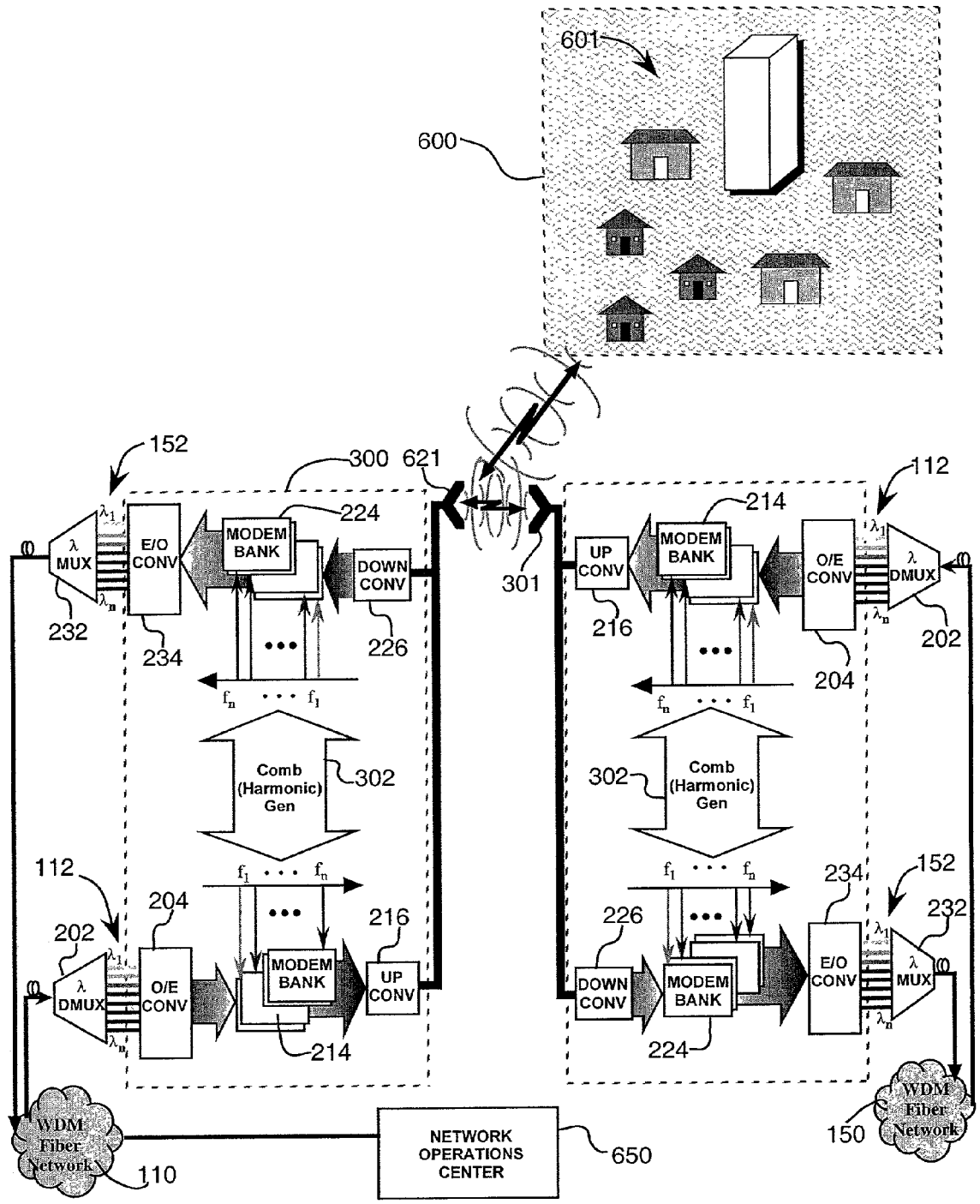
FIG. 6 is a block diagram of an embodiment of a WWDM system according to the present invention that provides access to selected users, such as those in a local multipoint distribution system.

FIG. 6 illustrates a mixed service WWDM system where signals on some of the WWDM RF channels are directed, via a re-configurable antenna 621, to selected users 601, such as in a local multipoint distribution system (LMDS) 600. The RF channels allocated for LMDS users 601 may be operated as a combination of broadcast and interactive communication channels. A network operations center (NOC) 650 coupled to the OWDM network 110 may provide for network operation, management, and control for each channel. Specifically, the NOC may control the routing of certain WWDM channels to specific LMDS users 601, and may also control the re-configurable antenna 621 to direct specific RF channels to specific users or areas.

Figure 7A:
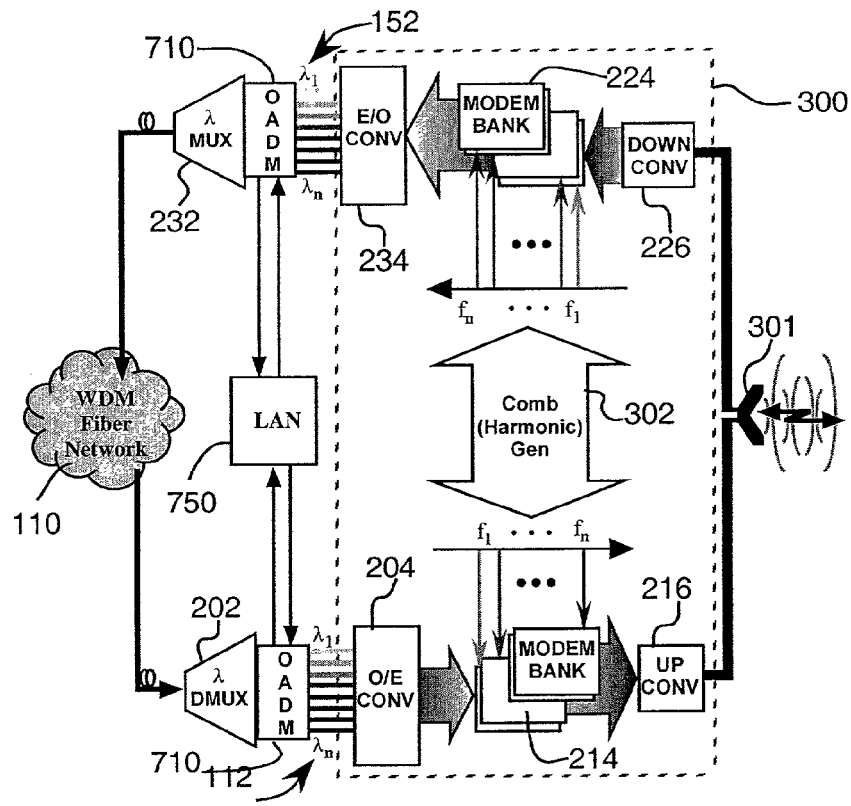
FIG. 7A is a block diagram of a WWDM transceiver coupled to an optical add-drop multiplexer (OADM).
Figure 7B:
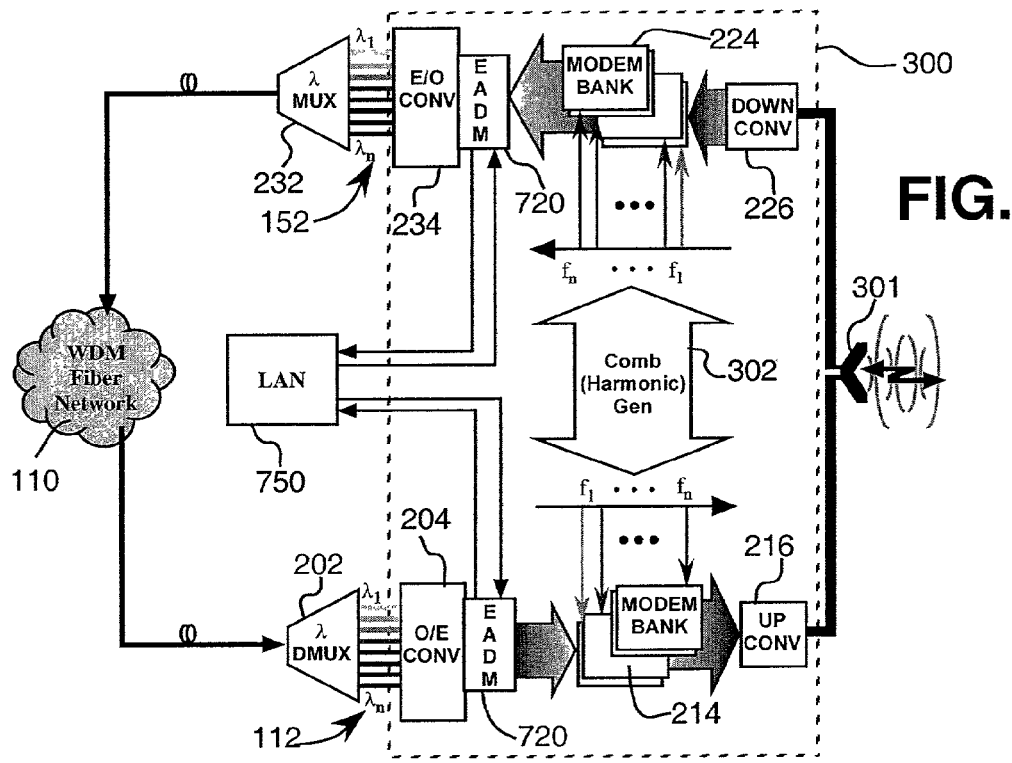
FIG. 7B is a block diagram of a WWDM transceiver coupled to an electrical add-drop multiplexer (EADM).

Another embodiment of a WWDM system according to the present invention provides add/drop multiplexing at the WWDM transceiver. FIG. 7A shows a block diagram in which optical add-drop multiplexers (OADMs) 710 may intercept the first or second set of individual optical signals 112, 152 between the optical demultiplexer 202 and the optical to electrical converter 204 or the electrical-to-optical converter 234 and the optical multiplexer 232. The OADMs 710 may be used to route data to a LAN 750 by dropping an optical channel from transmission by the WWDM transceiver and instead routing that channel to the LAN 750 or by dropping an optical channel from insertion into the OWDM network 110 and again routing that channel to the LAN 750. Similarly, data from the LAN 750 can be added by the OADMs 710 for either transmission by the WWDM transceiver 300 or coupling to the OWDM network 110. Hence, add/drop multiplexing can be used in a WWDM system in much the same fashion as add/drop multiplexing is used in all optical networks. FIG. 7B shows a block diagram where an electrical add/drop multiplexer (EADM) 720 is used to route data to and from a LAN 750.

Figure 8:
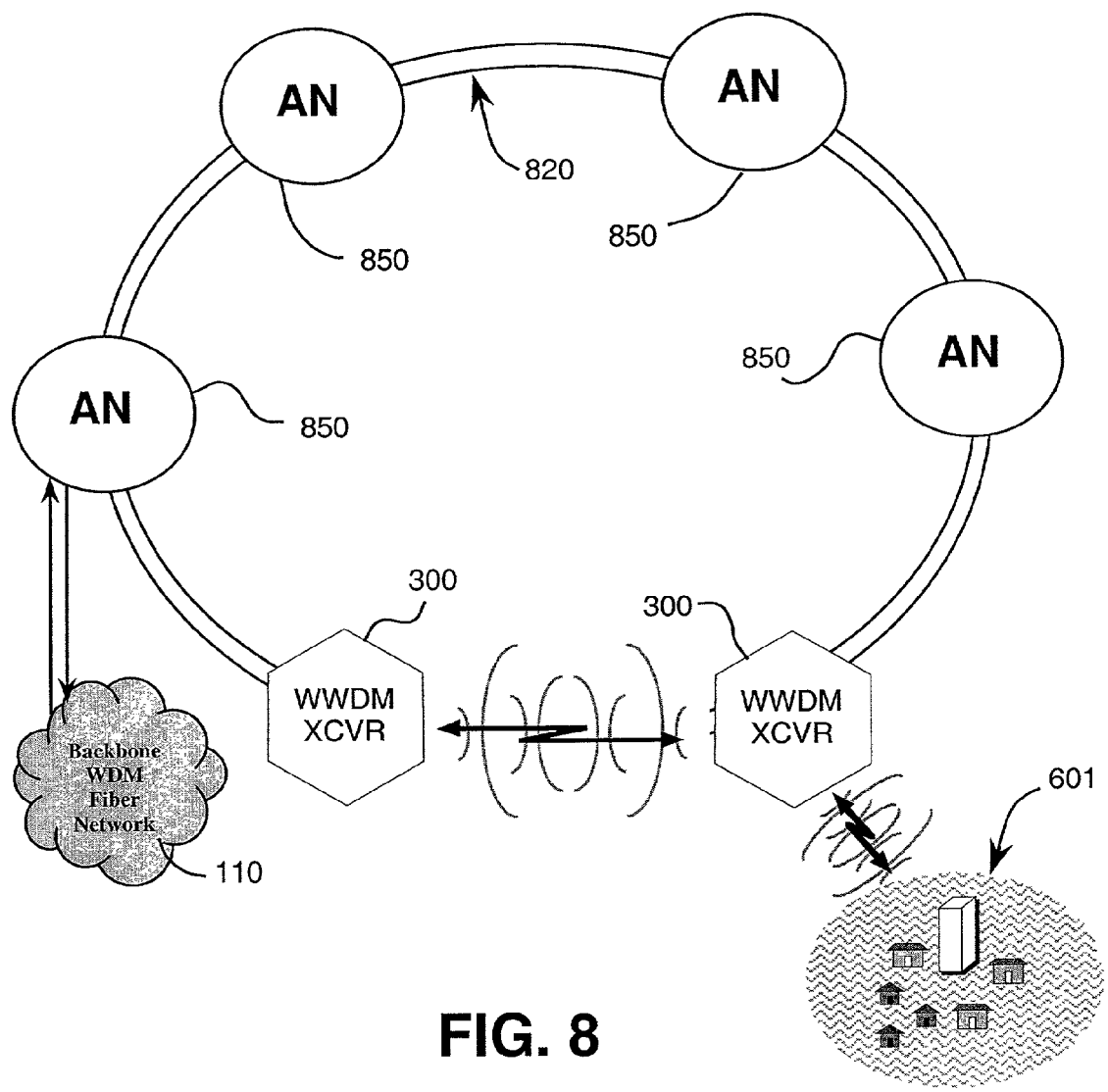
FIG. 8 depicts WWDM transceivers incorporated into an OWDM ring topology, where the WWDM transceivers close the ring.

FIG. 8 depicts an OWDM ring architecture where WWDM transceivers 300 are used to close the ring. Data is coupled into and out of the optical portions of the ring at access nodes (AN) 850. Optical access nodes, such as OADMs, optical switches, etc., are well known in the art. The ring in FIG. 8 is depicted as having two link lines. Typically, in a ring architecture, data is passed from one AN 850 to another in one direction in one link line, and in the opposite direction in the other link line. Other ring architectures may have multiple pairs of link lines to provide for higher system reliability, where each pair of link lines has data running in the lines in opposite directions. Data transfer in a ring topology is generally faster and more reliable than in other network topologies, such as a ladder topology. However, a ring topology requires a means for closing the ring, that is, providing connectivity completely around the ring. In certain areas, there may be no fiber to provide a connection between two geographically separated ANs. In this case, a WWDM network provides the capability for "closing the ring."

In FIG. 8, two WWDM transceivers 300 provide for a network connection between the two ends of the OWDM ring. As described above, standard wireless frequency allocations may be used to provide for a one-to-one mapping between the OWDM wavelengths and the wireless frequencies. Since the frequency conversions are performed entirely within the WWDM transceivers 300, the conversion from optical to wireless and back is completely transparent to the data being transferred around the ring. Hence, no network management or control continuity is required to manage the transmission of data between the WWDM transceivers 300. The ring is, therefore, closed by the WWDM transceivers 300 in the same manner as if the ring closure was performed by two ANs linked by fiber.

FIG. 8 also depicts the additional capability of the WWDM transceivers 300 to support distribution of data services to other users, while supporting OWDM ring data transfers. As also shown in FIG. 6, the WWDM transceivers 300 may support the transmission of data to and from other wireless users 601, such as those supported by an LMDS. The WWDM transceivers 300 allow the exchange of data between the wireless users 601 and the OWDM ring network, and, potentially, the exchange of data between the wireless users 601 and a backbone WDM fiber network 110. The coupling of WWDM transceivers to an OWDM ring architecture demonstrates the flexibility and capability of the WWDM systems according to the present invention. As one skilled in the art can appreciate from the architecture depicted in FIG. 8, WWDM systems may support extremely complex network architectures.

Another embodiment of a WWDM system according to the present invention may be used to distribute different services to different users at the same or different RF bands. As previously discussed, OWDM networks may have different services allocated to different optical wavelengths. Since WWDM allocates specific RF channels to specific optical wavelengths, WWDM systems may also be used to distribute the services allocated to different optical wavelengths. With WWDM systems, different bandwidth and channel rates may be allocated to different RF bands and can provide the flexibility of broadcast, multi-cast, or mono-cast communications.

Figure 10:
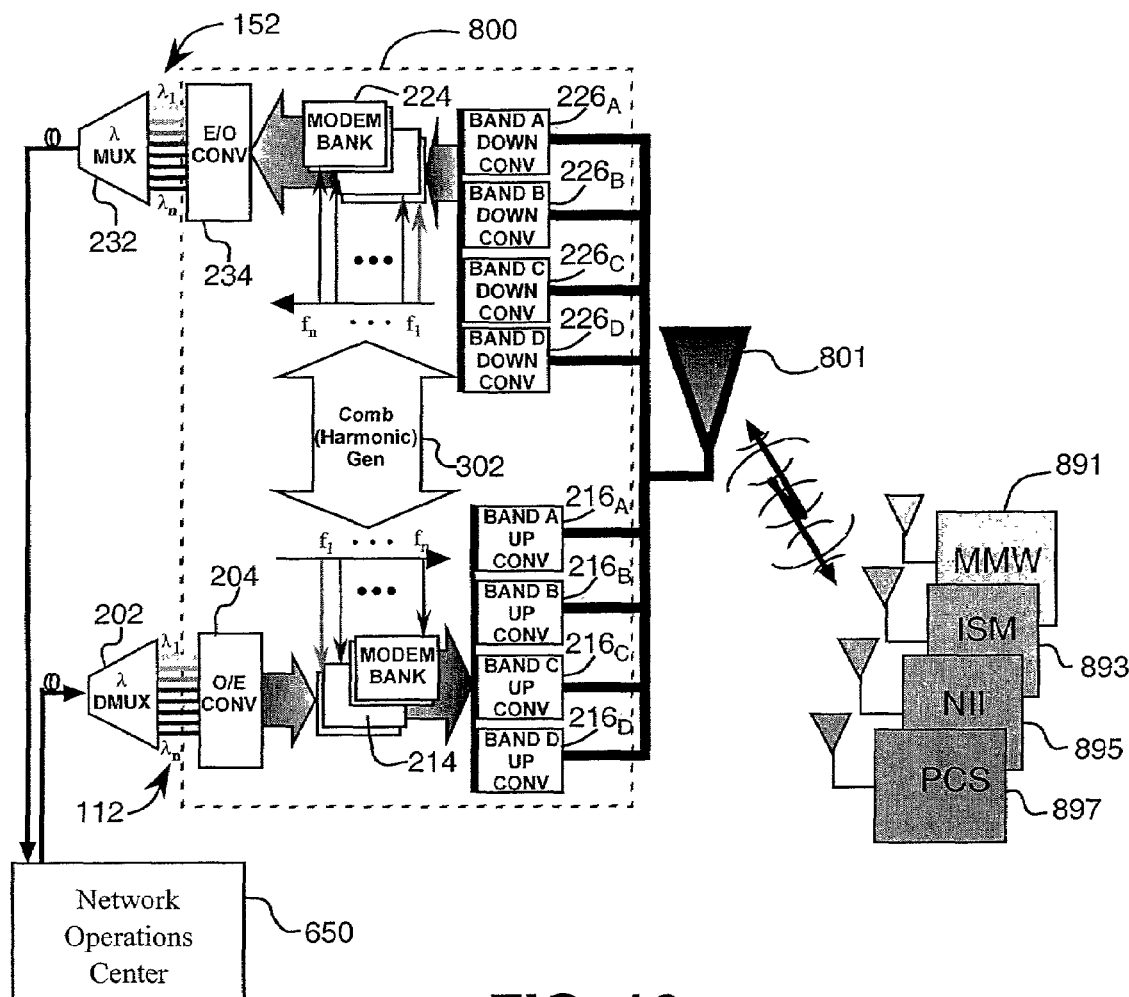
FIG. 10 is a block diagram of an embodiment of a WWDM system according to the present invention which supports multiple users at multiple RF bands.

FIG. 10 illustrates a NOC used to transfer data to a WWDM transceiver 800 for multiple users. The WWDM transceiver 800 acts as a base station for communication with different types of users at different bands. Hence, the WWDM transceiver 800 may contain multiple upconverters $216_A$, $216_B$, $216_C$, $216_D$ and multiple downconverters $226_A$, $226_B$, $226_C$, $226_D$ to support the transmission and reception of WWDM signals at multiple bands. The radiating aperture 801 coupled to the upconverters $216_A$, $216_B$, $216_C$, $216_D$ and the downconverters $226_A$, $226_B$, $226_C$, $226_D$ may comprise a single wideband antenna or multiple narrowband antennas. The radiating aperture may also be highly directional, so as to provide support for users in a limited geographical area, or it may be more omnidirectional, to support users in a more dispersed geographical area.

FIG. 10 also illustrates the type of users that may be supported by the WWDM transceiver 800. For example, the users may comprise PCS band users, industrial and scientific data users, broadcast video-TV users, and high speed data (>20 Mbps) users. The WWDM transceiver 800 may send and receive data for PCS users in the PCS band (around 2 GHz), industrial and scientific data users in the industrial, scientific, and medical (ISM) bands (around 900 MHz, 2.4 GHz, 5.3 GHz, 5.7 GHz, and 5.8 GHz), broadcast video users in the national information infrastructure (NII) bands (around 5.15-5.35 GHz and 5.75-5.85 GHz), and high speed data users at the millimeter-wave (MMW) frequencies. The WWDM transceiver would transfer the information for each band to a single optical wavelength or groups of wavelengths to be recognized by the NOC.

Figure 9A:
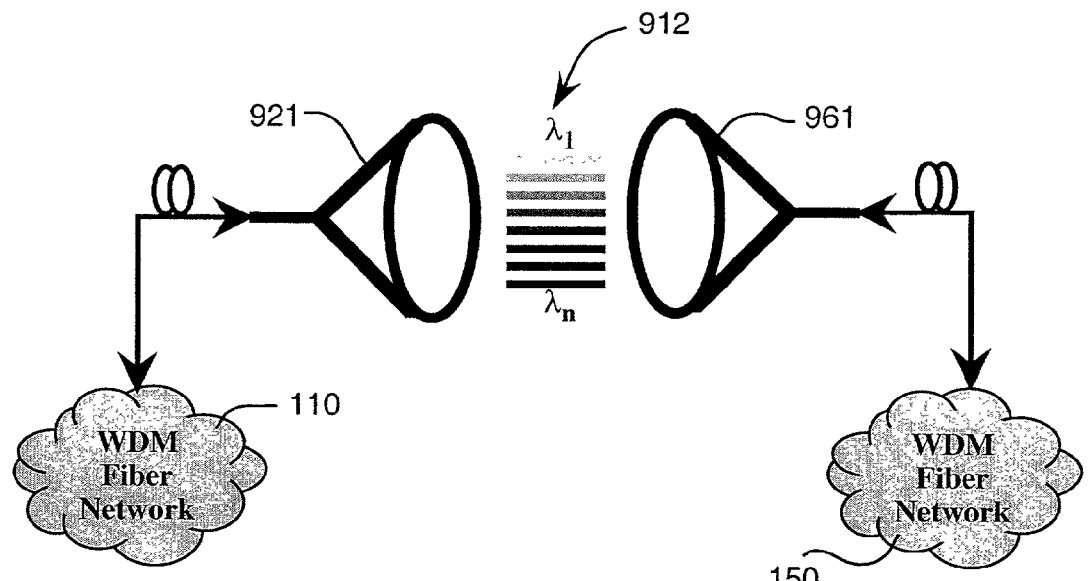
FIG. 9A is a block diagram on an embodiment of a WWDM system according to the present invention that couples WDM networks through free-space transmission of optical signals.

The wireless WDM network provided by the present invention is not limited to RF signals. Another embodiment of the present invention may use free-space transmission of optical signals to link fiber-based OWDM networks, as shown in FIG. 9A. In FIG. 9A, the optical channels within a first fiber OWDM network 110 are directed to an optical WWDM radiator 921. The optical WWDM radiator 921 then directs the optical channels 912 to an optical receiver 961, where the signals are then directed to a second fiber OWDM network 150. Prior to radiation from the optical WWDM radiator, the optical channels 912 may be shifted to different optical wavelengths to facilitate the transmission of the optical signals. If the optical wavelengths are shifted upon transmission, the optical wavelengths would, preferably, be shifted back to the original wavelengths after reception by the optical receiver 961.

Figure 9B:
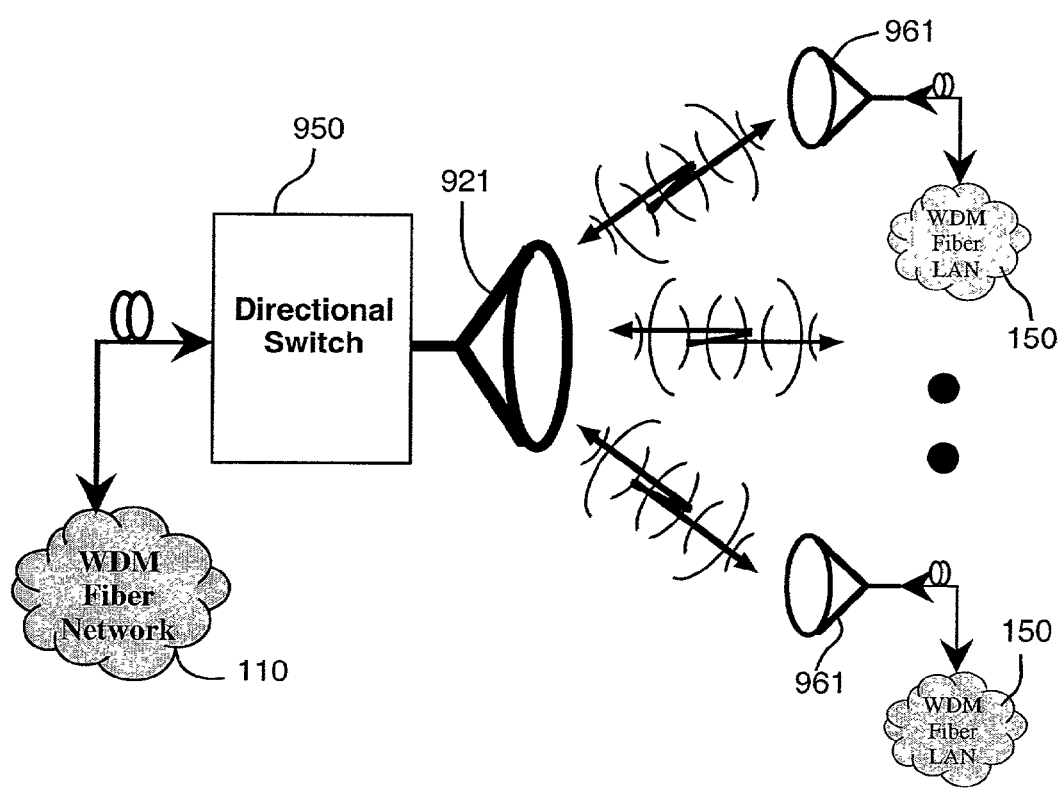
FIG. 9B is a block diagram of an embodiment of a WWDM system according to the present invention in which a directional switch steers free-space radiated optical signals to multiple networks.

FIG. 9B depicts an optical WWDM system that supports optical transmissions to multiple fiber networks 150. As shown in FIG. 9B, an optical beam steerer 950 coupled to a optical WWDM radiator 921 may be used to direct optical signals to specific optical WWDM receivers 961 coupled to other fiber networks 150. Beam steerers based on an optical switch such as an electro-optical lithium niobate switch may be particularly applicable for beam steering in this application, due to their capability to quickly steer optical beams in different directions.

Optical transmission of WWDM signals provides the ability to link OWDM networks in situations where RF transmissions may be subject to interference, or where data rates may exceed the bandwidth available for RF transmissions. Possible applications of optical WWDM systems are inter satellite communications or terrestrial optical communications links. Once again, a standard assignment of optical channels is preferred to facilitate links between different networks.

From the foregoing description, it will be apparent that the present invention has a number of advantages, some of which have been described herein, and others of which are inherent in the embodiments of the invention described herein. Those skilled in the art can appreciate that the networking techniques and architectures described herein can be applied to terrestrial, terrestrial to stratospheric, intra stratospheric communications, satellite, and inter-satellite communications as well as optical and/or RF communication links to facilitate global network management. Also, it will be understood that modifications can be made to the method and apparatus of wireless wavelength division multiplexed networks described herein without departing from the teachings of subject matter described herein. As such, the invention is not to be limited to the described embodiments except as required by the appended claims.

What is claimed is:

1. A method for coupling optical wavelength division multiplexed (OWDM) networks having one or more OWDM channels, the method comprising:
   receiving the one or more OWDM channels from a first OWDM network, each OWDM channel having a different OWDM wavelength;
   converting each one of the one or more OWDM channels to a wireless frequency division multiplexing (WFDM) channel to produce one or more radio frequency WFDM channels at a plurality of WFDM frequencies, each WFDM frequency for each WFDM channel being different from the WFDM frequency for each other WFDM channel, and each WFDM frequency corresponding to an OWDM wavelength;
   radiating the one or more WFDM channels;
   receiving the one or more WFDM channels;
   converting each received WFDM channel from the WFDM frequency for the received WFDM channel to the corresponding OWDM wavelength for the received WFDM channel to produce one or more received OWDM channels; and
   coupling the one or more received OWDM channels into a second OWDM network.

2. The method as claimed in claim 1 wherein each OWDM channel is assigned a WFDM frequency at a specified radio frequency, the assignment of the OWDM channel to the specified radio frequency determined from a standardized one-to-one mapping of OWDM wavelengths to radio frequencies, and each OWDM channel is converted to an assigned WFDM frequency and each WFDM channel is converted to an assigned OWDM wavelength.

3. The method as claimed in claim 2 wherein the standardized one-to-one mapping is determined from the data rate of the OWDM channel and the bandwidth available at the specified radio frequency.

4. The method as claimed in claim 2 wherein the standardized one-to-one mapping is determined from the service supported by the OWDM channel and the bandwidth available at the specified radio frequency.

5. The method as claimed in claim 2 wherein the specified radio frequency is in a radio frequency band selected from the group of radio frequency bands consisting of cellular communications bands, personal communication services (PCS) bands, national information infrastructure (NII) bands, industrial, scientific, and medical (ISM) bands, or local multipoint distribution system (LMDS) bands.

6. The method as claimed in claim 2, further comprising:
   receiving at least one of the one or more WFDM channels at one or more radio frequency users.

7. The method as claimed in claim 6, further comprising:
   transmitting one or more communication signals from one or more of the radio frequency users, each communication signal being at one of the WFDM frequencies of the plurality of WFDM frequencies;
   receiving the one or more communication signals;
   converting each one of the one or more communication signals at the WFDM frequencies to a received communication signal at the OWDM wavelength assigned to the WFDM frequency; and
   coupling the received communication signal to the first OWDM network or to the second OWDM network.

8. The method as claimed in claim 2, wherein converting each one of the one or more OWDM channels to a wireless frequency division multiplexing (WFDM) channel to produce one or more WFDM channels comprises:
   providing a comb frequency generator producing a plurality of intermediate frequencies;
   demultiplexing each one of the one or more OWDM channels into one or more separate optical signals;
   converting the one or more separate optical signals into one or more baseband electrical signals;
   modulating each one of the one or more baseband electrical signals on a separate intermediate frequency of the plurality of intermediate frequencies to produce one or more modulated intermediate frequency signals; and
   up-converting each one of the one or more modulated intermediate frequency signals to produce the one or more WFDM channels.

9. The method as claimed in claim 2, wherein converting each received WFDM channel from the WFDM frequency for the received WFDM channel to the corresponding OWDM wavelength comprises:
   providing a comb frequency generator producing a plurality of intermediate frequencies;
   downconverting each one of the received WFDM channels to produce one or more downconverted signals;
   demodulating each one of the downconverted signals with a separate intermediate frequency of the plurality of intermediate frequencies to produce one or more received baseband signals;
   converting each one of the received baseband signals to a received optical signal, each received optical signal being at the OWDM wavelength of the OWDM channel corresponding to the WFDM channel from which each received optical signal is derived; and
   multiplexing each one of the received optical signals to produce one or more received OWDM channels.

10. The method as claimed in claim 1, wherein the first OWDM network comprises a first end of an OWDM ring architecture network and the second OWDM network comprises a second end of the OWDM ring architecture network, and the method couples the first end to the second end.

11. The method as claimed in claim 1, wherein receiving the one or more OWDM channels further comprises:
directing one or more OWDM channels to a local area network.

12. The method as claimed in claim 1, wherein receiving the one or more OWDM channels further comprises:
adding one or more optical channels from a local area network to the one or more OWDM channels.

13. The method as claimed in claim 1, wherein receiving the one or more OWDM channels further comprises:
directing one or more OWDM channels to a local area network; and,
adding one or more optical channels from a local area network to the one or more OWDM channels.

14. The method as claimed in claim 1, wherein one or more of the WFDM channels contain voice/data services and the method further comprises:
receiving the one or more of the WFDM channels containing voice/data services at one or more wireless users; and,
extracting the voice/data services from the one or more WFDM channels.

15. The method as claimed in claim 1, wherein the method further comprises:
converting voice/data services from one or more wireless users to one or more voice/data WFDM channels at WFDM frequencies;
radiating the one or more voice/data WFDM channels from one or more wireless users;
receiving the one or more voice/data WFDM channels;
converting each received voice/data WFDM channels from the WFDM frequency for the voice/data WFDM channel to the corresponding OWDM wavelength for the WFDM frequency to produce one or more received voice/data OWDM channels; and
coupling the one or more received voice/data OWDM channels into the first or second OWDM network.

16. The method as claimed in claim 1, wherein one or more of the OWDM channels are allocated for voice/data services and the method further comprises:
converting one or more of the OWDM channels allocated for network voice/data services to one or more network voice/data WFDM channels;
radiating the one or more network voice/data WFDM channels;
receiving the one or more network voice/data WFDM channels at one or more wireless users;
extracting the network voice/data services from the one or more network voice/data WFDM channels;
converting user voice/data services from one or more wireless users to one or more user voice/data WFDM channels at WFDM frequencies;
radiating the one or more user voice/data WFDM channels;
receiving the one or more user voice/data WFDM channels;
converting each user voice/data WFDM channels from the WFDM frequency for the user voice/data WFDM channel to the corresponding OWDM wavelength for the WFDM frequency to produce one or more user voice/data OWDM channels; and
coupling the one or more user voice/data OWDM channels into the first or second OWDM network.

17. The method as claimed in claim 1, wherein the OWDM networks comprise fiber OWDM networks.

18. A wireless frequency division multiplexing (WFDM) system for coupling optical wavelength division multiplexed (OWDM) networks comprising:
one or more WFDM transmitters receiving one or more optical wavelength division multiplexed (OWDM) channels, each OWDM channel having a different OWDM wavelength, said WFDM transmitter converting the one or more OWDM channels to one or more radio frequency WFDM channels, each WFDM channel having a different WFDM frequency;
one or more radiating apertures coupled to each WFDM transmitter, said radiating apertures radiating the WFDM channels;
one or more receiving apertures receiving WFDM channels;
one or more WFDM receivers coupled to the one or more receiving apertures, each WFDM receiver receiving one or more received WFDM channels, and each WFDM receiver converting the one or more received WFDM channels to one or more OWDM channels.

19. The system as claimed in claim 18 wherein each OWDM channel is assigned a WFDM frequency at a specified radio frequency, the assignment of the OWDM channel to the specified radio frequency determined from a standardized one-to-one mapping of OWDM wavelengths to radio frequencies, and each OWDM channel is converted to an assigned WFDM frequency and each WFDM channel is converted to an assigned OWDM wavelength.

20. The system as claimed in claim 19 wherein the standardized one-to-one mapping is determined from the data rate of the OWDM channel and the bandwidth available at the specified radio frequency.

21. The system as claimed in claim 19 wherein the standardized one-to-one mapping is determined from the service supported by the OWDM channel and the bandwidth available at the specified radio frequency.

22. The system as claimed in claim 19 wherein the specified radio frequency is in a radio frequency band selected from the group of radio frequency bands consisting of cellular communications bands, personal communication services (PCS) bands, national information infrastructure (NII) bands, industrial, scientific, and medical (ISM) bands, or local multipoint distribution system (LMDS) bands.

23. The system as claimed in claim 19, wherein the one or more radiating apertures radiate WFDM channels to selected receiving radio frequency users and the one or more receiving apertures receive WFDM channels from selected transmitting radio frequency users.

24. The system as claimed in claim 18, wherein at least one WFDM transmitter comprises:
an OWDM demultiplexer;
an optical-to-electrical converter coupled to the OWDM demultiplexer and producing one or more baseband electrical signals;
a comb frequency generator producing a plurality of intermediate frequency signals;
a bank of modulators, each modulator in the bank of modulators receiving a baseband electrical signal from the optical-to-electrical converter and receiving an intermediate frequency signal from the comb frequency generator and producing a modulated intermediate frequency electrical signal; and
one or more upconverters receiving the modulated intermediate frequency signals and producing the one or more WFDM channels.

25. The system as claimed in claim 18, wherein at least one WFDM receiver comprises:
one or more downconverters receiving the one or more received WFDM channels and producing one or more received downconverted signals;
a comb frequency generator producing a plurality of intermediate frequency signals;
a bank of demodulators, each demodulator in the bank of demodulators receiving one of the one or more received downconverted signals from the one or more downconverters and receiving an intermediate frequency signal from the comb frequency generator and producing a demodulated baseband electrical signal;
an electrical-to-optical converter receiving each one of the demodulated baseband electrical signals and producing an optical signal for each demodulated baseband electrical signal at an OWDM wavelength corresponding to the WFDM frequency for the WFDM channel from which the optical signal is derived; and
an OWDM multiplexer receiving each optical signal and producing the one or more OWDM channels.

26. The system as claimed in claim 18, wherein at least one WFDM transmitter and at least one WFDM receiver is combined into a WFDM transceiver, the WFDM transceiver comprising:
an OWDM demultiplexer;
an optical-to-electrical converter coupled to the OWDM demultiplexer and producing one or more baseband electrical signals;
a comb frequency generator producing a plurality of intermediate frequency signals;
a bank of modulators, each modulator in the bank of modulators receiving a baseband electrical signal from the optical-to-electrical converter and receiving an intermediate frequency signal from the comb frequency generator and producing a modulated intermediate frequency electrical signal;
one or more upconverters receiving the modulated baseband signals and producing the one or more WFDM channels;
one or more downconverters receiving the one or more received WFDM channels and producing one or received downconverted signals;
a bank of demodulators, each demodulator in the bank of demodulators receiving one of the one or more received downconverted signals from the one or more downconverters and receiving an intermediate frequency signal from the comb frequency generator and producing a demodulated baseband electrical signal;
an electrical-to-optical converter receiving each one of the demodulated baseband electrical signals and producing an optical signal for each demodulated baseband electrical signal at an OWDM wavelength corresponding to the WFDM frequency wave for the WFDM channel from which the optical signal is derived; and
an OWDM multiplexer receiving each optical signal and producing the one or more OWDM channels.

27. The system as claimed in claim 18, wherein at least one WFDM transmitter of the one or more WFDM transmitters is connected to a first end of an OWDM ring architecture network and at least one WFDM receiver of the one or more WFDM receivers is connected to a second end of the OWDM ring architecture network and the transmission of data from the at least one WFDM transmitter to the at least one WFDM receiver closes the OWDM ring architecture network.

28. The system as claimed in claim 18, wherein one or more of the OWDM channels are allocated for voice/data services, the OWDM channels for voice/data services being converted to network voice/data WFDM channels, and the system further comprising one or more wireless users receiving the network voice/data WFDM channels.

29. The system as claimed in claim 18, the system further comprising one or more wireless users transmitting voice/data services on one or more WFDM channels, wherein the one or more WFDM channels containing voice/data services are received by the one or more WFDM receivers and converted to OWDM channels.

30. The system as claimed in claim 18, wherein one or more of the OWDM channels are allocated for voice/data services, the OWDM channels for voice/data services being converted to network voice/data WFDM channels, and the system further comprising one or more wireless users receiving the network voice/data WFDM channels and sending voice/data services on one or more WFDM channels, and wherein the one or more WFDM channels containing voice/data services are received by the one or more WFDM receivers and converted to the OWDM channels allocated for voice/data services.

31. The system as claimed in claim 18, the system further comprising an add-drop multiplexer.

32. The system as claimed in claim 31, wherein the add-drop multiplexer directs one or more OWDM channels to a local area network.

33. The system as claimed in claim 31, wherein the add-drop multiplexer adds one or more optical channels from a local area network to the one or more OWDM channels.

34. The system as claimed in claim 18, wherein the OWDM networks comprise fiber OWDM networks.

35. A method for distributing voice or data services to one or more users at one or more radio frequency bands, the method comprising:
receiving the voice or data services in one or more OWDM channels from a network operations center, each OWDM channel having a different OWDM wavelength;
converting each one of the one or more OWDM channels to a transmitted wireless frequency division multiplexing (WFDM) channel to produce one or more transmitted WFDM channels at a plurality of WFDM frequencies, the WFDM frequencies being at radio frequencies, each WFDM frequency for each transmitted WFDM channel being different from the WFDM frequency for each other transmitted WFDM channel, and each WFDM frequency corresponding to an OWDM wavelength;
radiating the one or more transmitted WFDM channels;
receiving the transmitted WFDM channels; and
converting each received WFDM channel from the WFDM frequency for the received WFDM channel to the corresponding OWDM wavelength.

36. The method as claimed in claim 35 wherein each OWDM channel is assigned a WFDM frequency at a specified radio frequency, the assignment of the OWDM channel to the specified radio frequency determined from a standardized one-to-one mapping of OWDM wavelengths to radio frequencies, and each OWDM channel is converted to an assigned WFDM frequency and each WFDM channel is converted to an assigned OWDM wavelength.

37. The method as claimed in claim 35, further comprising:
transmitting the voice or data services from one or more users in a user transmitted WFDM channel at a selected WFDM frequency;
receiving the user transmitted WFDM channel;
converting the user transmitted WFDM channel to an OWDM channel at the OWDM wavelength corresponding to the selected WFDM frequency; and coupling the OWDM channel to the network operations center.

38. A wireless frequency division multiplexing (WFDM) system for distributing voice and data services to one or more users in one or more radio frequency band comprising:
   a network operations center coupling voice or data services into OWDM channels, each OWDM channel having a different OWDM wavelength;
   one or more WFDM transmitters receiving one or more optical wavelength division multiplexed (OWDM) channels from the network operations center, said one or more WFDM transmitters converting the one or more OWDM channels to one or more transmitted radio frequency WFDM channels at a plurality of WFDM frequencies, each WFDM channel having a different WFDM frequency and each WFDM frequency corresponding to an OWDM wavelength;
   one or more radiating apertures coupled to each WFDM transmitter of the one or more WFDM transmitters, said radiating apertures radiating the transmitted WFDM channels;
   receiving the transmitted WFDM channels; and
   converting each received WFDM channel from the WFDM frequency for the received WFDM channel to the corresponding OWDM wavelength.

39. The system as claimed in claim 38 wherein each OWDM channel is assigned a WFDM frequency at a specified radio frequency, the assignment of the OWDM channel to the specified radio frequency determined from a standardized one-to-one mapping of OWDM wavelengths to radio frequencies, and each OWDM channel is converted to an assigned WFDM frequency and each WFDM channel is converted to an assigned OWDM wavelength.

40. The system as claimed in claim 38, further comprising:
   one or more users transmitting the voice or data services in one or more user transmitted WFDM channels, each user transmitted WFDM channel at a selected WFDM frequency;
   one or more receiving apertures receiving the one or more user transmitted WFDM channels;
   one or more WFDM receivers coupled to the one or more receiving apertures, each WFDM receiver receiving the one or more user transmitted WFDM channels, and each WFDM receiver converting the one or more user transmitted WFDM channels to one or more OWDM channels, the one or more OWDM channels being coupled to the network operations center.

41. A method for transmitting one or more optical wavelength division multiplexed (OWDM) channels of an OWDM network, the method comprising:
   receiving the one or more OWDM channels from an OWDM network, each OWDM channel having a different OWDM wavelength;
   converting each one of the one or more OWDM channels to a wireless frequency division multiplexing (WFDM) channel to produce one or more radio frequency WFDM channels at a plurality of WFDM frequencies, each WFDM frequency for each WFDM channel being different from the WFDM frequency for each other WFDM channel, and each WFDM frequency corresponding to an OWDM wavelength;
   radiating the one or more WFDM channels;
   receiving the transmitted WFDM channels, wherein each received WFDM channel is converted from the WFDM frequency for the received WFDM channel to the corresponding OWDM wavelength.

42. The method as claimed in claim 41 wherein each OWDM channel is assigned a WFDM frequency at a specified radio frequency, the assignment of the OWDM channel to the specified radio frequency determined from a standardized one-to-one mapping of OWDM wavelengths to radio frequencies, and each OWDM channel is converted to the assigned WFDM frequency.

43. The method as claimed in claim 42 wherein the standardized one-to-one mapping is determined from the data rate of the OWDM channel and the bandwidth available at the specified radio frequency.

44. The method as claimed in claim 42 wherein the standardized one-to-one mapping is determined from the service supported by the OWDM channel and the bandwidth available at the specified radio frequency.

45. The method as claimed in claim 42 wherein the specified radio frequency is in a radio frequency band selected from the group of radio frequency bands consisting of cellular communications bands, personal communication services (PCS) bands, national information infrastructure (NII) bands, industrial, scientific, and medical (ISM) bands, or local multipoint distribution system (LMDS) bands.

46. The method as claimed in claim 42, wherein converting each one of the one or more OWDM channels to a WFDM channel to produce one or more WFDM channels comprises:
   providing a comb frequency generator producing a plurality of intermediate frequencies;
   demultiplexing each one of the one or more OWDM channels into one or more separate optical signals;
   converting the one or more separate optical signals into one or more baseband electrical signals;
   modulating each one of the one or more baseband electrical signals on a separate intermediate frequency of the plurality of intermediate frequencies to produce one or more modulated intermediate frequency signals; and
   up-converting each one of the one or more intermediate frequency signals to produce the one or more WFDM channels.

47. The method as claimed in claim 41, wherein one or more of the OWDM channels are allocated for voice/data services and the method further comprises:
   converting one or more of the OWDM channels allocated for network voice/data services to one or more network voice/data WFDM channels; and
   radiating the one or more network voice/data WFDM channels.

48. The method as claimed in claim 41, wherein the OWDM network comprises a fiber OWDM network.

49. A wireless frequency division multiplexing transmitter transmitting one or more optical wavelength division multiplexed (OWDM) channels at wireless frequencies, said transmitter comprising:
   an optical-to-electrical converter receiving said OWDM channels and producing one or more baseband electrical signals;
   a comb frequency generator producing a plurality of intermediate frequency signals;
   a bank of modulators, each modulator in the bank of modulators receiving a baseband electrical signal from the optical-to-electrical converter and receiving an intermediate frequency signal from the comb frequency generator and producing a modulated intermediate frequency electrical signal; and
   one or more upconverters receiving the modulated baseband signals and producing one or more wireless frequency division multiplexed channels at radio frequencies.

50. The transmitter as claimed in claim 49 wherein each OWDM channel is assigned a WFDM frequency at a specified radio frequency, the assignment of the OWDM channel to the specified radio frequency determined from a standardized one-to-one mapping of OWDM wavelengths to radio frequencies, and each OWDM channel is converted to the assigned WFDM frequency.

51. The transmitter as claimed in claim 50 wherein the standardized one-to-one mapping is determined from the data rate of the OWDM channel and the bandwidth available at the specified radio frequency.

52. The transmitter as claimed in claim 50 wherein the standardized one-to-one mapping is determined from the service supported by the OWDM channel and the bandwidth available at the specified radio frequency.

53. The transmitter as claimed in claim 50 wherein the specified radio frequency is in a radio frequency band selected from the group of radio frequency bands consisting of cellular communications bands, personal communication services (PCS) bands, national information infrastructure (NII) bands, industrial, scientific, and medical (ISM) bands, or local multipoint distribution system (LMDS) bands.

54. The transmitter as claimed in claim 49, wherein one or more of the OWDM channels are allocated for voice/data services, the OWDM channels for voice/data services being converted to network voice/data WFDM channels.

55. A method for coupling one or more received wireless frequency division multiplexed (WFDM) channels into an optical wavelength division multiplexed (OWDM) network, said method comprising:
  receiving one or more radio frequency WFDM channels, each WFDM channel having a different WFDM frequency, each WFDM frequency being converted from a corresponding OWDM wavelength;
  converting each one of the received WFDM channels from the WFDM frequency for that WFDM channel to the corresponding OWDM wavelength for that WFDM channel to produce one or more received OWDM channels; and
  coupling the one or more received OWDM channels into an OWDM network.

56. The method as claimed in claim 55 wherein each WFDM channel is at a specified radio frequency, and each WFDM channel is assigned an OWDM wavelength at a specified optical wavelength, the assignment of the WFDM channel to the specified optical wavelength determined from a standardized one-to-one mapping of WFDM frequencies to optical wavelengths, and each WFDM channel is converted to the assigned OWDM wavelength.

57. The method as claimed in claim 56 wherein the standardized one-to-one mapping is determined from the data rate of each OWDM channel and the bandwidth available at the specified radio frequency.

58. The method as claimed in claim 56 wherein the standardized one-to-one mapping is determined from the service supported by each OWDM channel and the bandwidth available at the specified radio frequency.

59. The method as claimed in claim 56 wherein the specified radio frequency is in a radio frequency band selected from the group of radio frequency bands consisting of cellular communications bands, personal communication services (PCS) bands, national information infrastructure (NII) bands, industrial, scientific, and medical (ISM) bands, or local multipoint distribution system (LMDS) bands.

60. The method as claimed in claim 55, wherein converting each one of the received WFDM channels from the WFDM frequency for that WFDM channel comprises:
  providing a comb frequency generator producing a plurality of intermediate frequencies;
  downconverting each one of the received WFDM channels to produce one or more downconverted signals;
  demodulating each one of the downconverted signals with a separate intermediate frequency of the plurality of intermediate frequencies to produce one or more received baseband signals;
  converting each one of the received baseband signals to a received optical signal, each received optical signal being at the corresponding OWDM wavelength; and
  multiplexing each one of the received optical signals to produce one or more received OWDM channels.

61. The method as claimed in claim 55, wherein the OWDM network comprises a fiber OWDM network.

62. A wireless frequency division multiplexed (WFDM) receiver converting WFDM channels at different WFDM frequencies to corresponding optical wavelength division multiplexed (OWDM) channels, said receiver comprising:
  one or more downconverters receiving the one or received WFDM channels and producing one or received baseband signals;
  a comb frequency generator producing a plurality of intermediate frequency signals;
  a bank of demodulators, each demodulator in the bank of demodulators receiving one of the one or more received baseband signals from the one or more downconverters and receiving an intermediate frequency signal from the comb frequency generator and producing a demodulated baseband electrical signal;
  an electrical-to-optical converter receiving each one of the demodulated baseband electrical signals and producing an optical signal for each demodulated baseband electrical signal at an OWDM wavelength corresponding to the WFDM frequency for the WFDM channel from which the optical signal is derived; and
  an OWDM multiplexer receiving each optical signal and producing the one or more OWDM channels.

63. The receiver as claimed in claim 62 wherein each WFDM channel is at a specified radio frequency, and each WFDM channel is assigned an OWDM wavelength at a specified optical wavelength, the assignment of the WFDM channel to the specified optical wavelength determined from a standardized one-to-one mapping of WFDM frequencies to optical wavelengths, and each WFDM channel is converted to the assigned OWDM wavelength.

64. The receiver as claimed in claim 63 wherein the standardized one-to-one mapping is determined from the data rate of the WFDM channel and the bandwidth available at the specified radio frequency.

65. The receiver as claimed in claim 63 wherein the standardized one-to-one mapping is determined from the service supported by the WFDM channel and the bandwidth available at the specified radio frequency.

66. The receiver as claimed in claim 63 wherein the specified radio frequency is in a radio frequency band selected from the group of radio frequency bands consisting of cellular communications bands, personal communication services (PCS) bands, national information infrastructure (NII) bands, industrial, scientific, and medical (ISM) bands, or local multipoint distribution system (LMDS) bands.

67. The transmitter as claimed in claim 62, wherein one or more of the WFDM channels are allocated for voice/data services, the WFDM channels for voice/data services being converted to network voice/data OWDM channels.

* * * * *